United States Patent [19]

Smithgall, Sr.

[11] 4,046,536

[45] Sept. 6, 1977

[54] MONITORING AND CONTROL OF OPTICAL FIBER DIAMETERS

[75] Inventor: David Harry Smithgall, Sr., East Windsor Township, Mercer County, N.J.

[73] Assignee: Western Electric Company, Inc., New York, N.Y.

[21] Appl. No.: 714,148

[22] Filed: Aug. 13, 1976

[51] Int. Cl.² .................................. C03B 37/02
[52] U.S. Cl. .................................. 65/2; 65/113; 65/29; 65/DIG. 7; 356/159; 356/200
[58] Field of Search ............... 356/106, 160, 199, 200, 356/159; 65/4, 29, 13, 2, DIG. 7

[56] References Cited

U.S. PATENT DOCUMENTS

| | | | |
|---|---|---|---|
| 3,265,476 | 8/1966 | Roberson | 65/29 X |
| 3,744,905 | 7/1973 | Smith | 356/159 X |
| 3,824,021 | 7/1974 | Axelrod | 356/200 |
| 3,879,128 | 4/1975 | Presby | 65/29 X |
| 3,982,816 | 9/1976 | Watkins | 356/159 X |

OTHER PUBLICATIONS

Fundamental Principles Western Electric, "Statistical Quality Control Handbook", pp. 3–41.

*Primary Examiner*—Robert J. Lindsay, Jr.
*Attorney, Agent, or Firm*—A. S. Rosen

[57] ABSTRACT

The diameters of successive axial portions of an optical fiber being drawn are monitored and controlled by an optical measuring technique in such manner as to eliminate the effects of occasional, anomalous measurements or "dropouts". Measurement validity is tested by comparing, with a maximum allowable value, the difference between each successive diameter measurement and a standard for diameter measurement validity. Some examples of such a standard are provided. In addition, two embodiments of fiber monitoring systems are disclosed, as well as an overall monitoring and control system for fiber diameters.

6 Claims, 4 Drawing Figures

MONITORING AND CONTROL OF OPTICAL FIBER DIAMETERS

BACKGROUND OF THE INVENTION

1. Field of the Invention

This invention relates to methods of monitoring successive axial portions of an optical fiber and, more particularly, to methods of measuring the diameters of successive axial portions of an optical fiber during the process of drawing the fiber, and for controlling the fiber drawing process in response to the diameter measurements taken.

2. Description of the Prior Art

In copending application Ser. No. 482,707, filed on June 21, 1974 by L. S. Watkins and entitled, "Method for Measuring the Parameters of Optical Fibers", which issued on Sept. 28, 1976 as U.S. Pat. No. 3,982,816 there is disclosed a technique for determining the diameters of successive axial portions of a clad or unclad, optical fiber. Such technique, which is typically performed upon an axially advancing fiber during the fiber drawing process, involves the illumination of a newly drawn, axially advancing fiber with a radially directed beam of coherent, monochromatic radiation, thereby creating a forward scattering pattern of interference fringes. The pattern is examined over a predetermined range of scattering angles in order to determine the number of fringes present in the predetermined range. A succession of counts of such fringes provides information as to the diameters of successive axial portions of the fiber advancing past the beam of radiation.

It has been discovered, however, that anomalous diameter readings, or "dropouts", will occur from time to time in practicing the technique of the copending Watkins application. These dropouts involve outputs which are in no way related to the diameter of the fiber. The dropouts are generally caused by local inhomogeneities in the advancing fiber, such as trapped air bubbles or surface imperfections, which greatly distort or completely break up the interference fringes in the forward scattering pattern being examined. Such dropouts can be of major significance, in that the instantaneous diameter readings caused by dropouts may vary to a very great degree from true diameter values. For example, dropouts indicating 50 micrometers to 100 micrometers apparent diameter changes are typical in examining fibers of approximately 100 micrometers true diameter. As a result, the use of the Watkins technique in controlling the diameter of an optical fiber during the drawing of the fiber, by providing process-controlling diameter indications, is severely affected by the occasional occurrence of dropouts. Since it may not be feasible to improve the fiber drawing process to such an extent as to eliminate the presence of occasional local inhomogenieties, it would clearly be advantageous to provide an improved technique for measuring the diameter of an advancing fiber, unaffected by occasional dropouts, and for controlling the fiber drawing process, also unaffected by occasional dropouts.

SUMMARY OF THE INVENTION

The invention contemplates the monitoring of successive axial portions of an optical fiber in such manner as to eliminate the effect of occasional dropouts on the taking of diameter measurements. The invention also contemplates the control of the diameter of such fiber, during the drawing of the fiber, by controlling the fiber drawing process in response only to valid diameter measurements taken, irrespective of any occasional occurrence of dropouts.

Monitoring, in accordance with the invention, involves the providing of a succession of measurements characterizing an optical fiber, using an optical measuring technique, by repeatedly measuring the diameters of successive axial portions of the fiber, comparing each successive diameter measurement with a predetermined standard for diameter measurement validity, and indicating as valid only those successive diameter measurements, each of which varies from the standard for diameter measurement validity by no greater than a predetermined value. The standard used for diameter measurement validity preferably comprises at least one previous diameter measurement which has been indicated as valid. In accordance with a first embodiment of the invention, the standard for diameter measurement validity may comprise the last previous diameter measurement which has been indicated as valid. In accordance with a second embodiment of the invention, the standard for diameter measurement validity may comprise an immediately preceding diameter measurement, where such immediately preceding diameter measurement has been indicated as valid, and a running average of those previous diameter measurements which have been indicated as valid, where the immediately preceding diameter measurement has not been indicated as valid.

The control of the fiber diameter, during the fiber drawing process, entails monitoring the fiber during drawing by the technique just described, and controlling the fiber drawing process in such manner as to tend to reduce the variation, from a predetermined, desired diameter value, of each successive diameter measurement indicated as valid, irrespective of any diameter measurement or measurements not indicated as valid. The monitoring and control techniques of the invention are particularly well suited for use in performing the optical fiber testing technique disclosed in the previously discussed copending application of L. S. Watkins.

DETAILED DESCRIPTION

Figure 1:
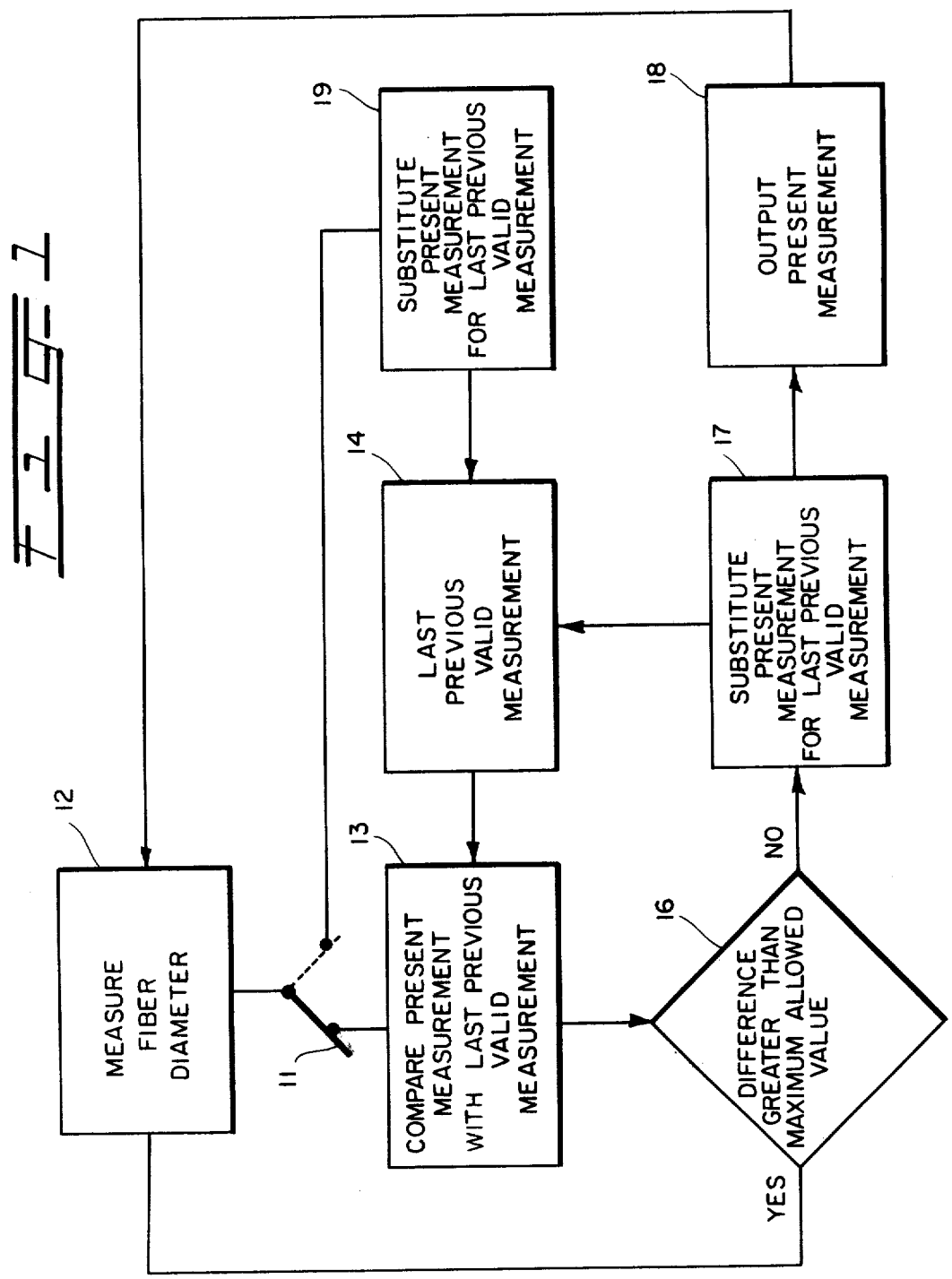
FIG. 1 of the drawing is a flow chart illustrating a first embodiment of a system for monitoring successive axial portions of an optical fiber, wherein the effect of occasional dropouts on the taking of diameter measurements is eliminated.

Referring initially to FIG. 1 of the drawing, a first embodiment of a system for measuring the diameters of successive axial portions of an optical fiber is illustrated in flow chart format. Such a system is particularly well suited for use in performing the optical fiber testing technique disclosed in copending application Ser. No. 482,707, filed on June 21, 1974 by L. S. Watkins and entitled, "Method for Measuring the Parameters of Optical Fibers" which issued on Sept. 28, 1976 as U.S. Pat. No. 3,982,816.

The optical fiber testing technique of the Watkins application, in general, involves the use of a beam of coherent, monochromatic radiation to illuminate successive axial portions of a clad or unclad, optical fiber, typically by impinging the beam radially upon a newly drawn fiber as it advances axially past the beam. A forward scattering pattern of interference fringes is thereby created. As more fully disclosed in the Watkins application, an examination of the forward scattering pattern, by counting the number of fringes present in a predetermined range of scattering angles as successive axial portions of the optical fiber are illuminated by the beam, provides information as to the diameter of each such successive axial portion of the advancing fiber.

Figure 3:
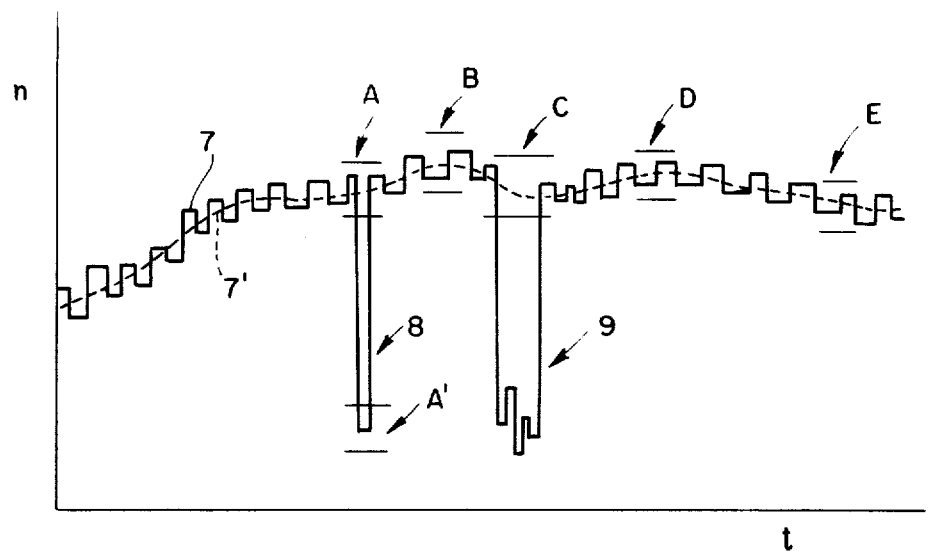
FIG. 3 indicates individual diameter readings, and a running average of valid diameter measurements, both plotted against time, providing information which is useful in considering the systems of FIGS. 1 and 2.

An illustration of a typical set of data, collected in measuring the diameters of successive axial portions of an axially advancing optical fiber by the technique of the Watkins application, is provided by FIG. 3 of the drawing. A succession of counts of fringes sensed in the predetermined range of scattering angles, represented along the vertical, "$n$" axis, is plotted against time, represented along the horizontal, "$t$" axis. The degree of the changes in the vertical, "$n$" direction is exaggerated somewhat, for the sake of clarity. The solid line 7 indicates a typical variation of counts with time as successive axial portions of the advancing fiber are examined. A single, short dropout 8 and a succession of dropouts at 9 are apparent along the line 7 at locations where the variation in counts from the previously observed pattern is quite large. Such dropouts may be caused by local inhomogenieties in the advancing fiber which markedly affect the scattering pattern.

The system of FIG. 1 preferably utilizes the measuring technique of the Watkins application, employing in connection with such technique an improvement designed to eliminate from the set of measurements taken, those measurements which are determined not to be valid, typically measurements corresponding to dropouts such as those illustrated at 8 and 9 in FIG. 3.

The system shown in FIG. 1 will initially be described with a switch 11 in its normal operating position, i.e., the position indicated in FIG. 1 by a solid line. Thus, each diameter measurement taken by an optical fiber diameter measuring system, e.g., the system disclosed in the Watkins application, as indicated by box 12 in FIG. 1, is compared, as at 13, with a standard, such standard being the last previous valid diameter measurement, as at 14. This, of course, presupposes the existence of at least one previous diameter measurement which has been found to be valid. The manner in which an initial, valid diameter reading may be determined will be discussed in due course hereinafter.

The comparison, at 13, between the present diameter measurement and the last previous valid diameter measurement, provides a measure or indication of the difference between the two diameter measurements. This difference is examined, as at 16, in order to determine whether the difference is greater than a predetermined, maximum allowed value of such difference for validity of the present measurement. Using an optical fiber diameter measuring system of the Watkins type, in which an interference fringe count value in the scattering angle range of interest may typically be somewhat in excess of 400 counts for a fiber diameter of about 100 micrometers, a value of two counts is considered an appropriate, maximum allowed value for the difference in counts examined at 16. The maximum allowed value of the difference is represented in FIG. 3, at several zones A, B, C, D and E along line 7, by pairs of parallel lines indicating approximate upper and lower validity boundaries for diameter measurements at certain points along the line 7 within such zones.

If the difference between the present diameter measurement and the standard, i.e., the last previous valid measurement, is greater than the maximum allowed value, e.g., more than two counts, as shown at zones A and C in FIG. 3, the next fiber diameter measurement is simply taken, at 12 (FIG. 1), the present measurement, which presumably represents a dropout, being omitted from the set of data collected in order to characterize the fiber. This is indicated by the "YES" path at the left side of FIG. 1. The absence of an indication of a valid diameter measurement corresponding to the particular axial portion of the fiber being examined, may be used to identify such axial portion as a probable location of a fault, or such absence may be supplemented for purposes of identification by any concurrently generated fault-indicating signal or marker. Alternatively, instead of omitting the present diameter measurement from the set of data collected, the last previous valid measurement may simply be substituted in the set of data, in place of the present diameter measurement.

If, on the other hand, the difference in diameter measurements is found not to be greater than the maximum allowed value, as shown at zones B, D and E in FIG. 3, the "NO" path of FIG. 1 is followed. Thus, the present diameter measurement is substituted for the last previous valid measurement, as at 17, for purposes of evaluating the next diameter measurement. The present diameter measurement is also outputted, as at 18, i.e., indicated as valid and utilized to characterize the optical fiber undergoing examination, whereupon the next successive diameter measurement is taken, at 12, as the cycle repeats. Thus, the path of line 7 in FIG. 3 may be followed during the collection of data as to diameters along successive axial portions of the fiber, with the dropouts 8 and 9 not resulting in any anomalous diameter reading. This is particularly advantageous when the diameter measurements are employed in controlling the fiber drawing process, as will be further discussed in due course hereinafter.

The manner in which an initial, valid diameter reading may be determined, permitting subsequent use of the system of FIG. 1 in the continuous monitoring of the diameters of successive axial portions of an optical fiber, will next be described. With the switch 11 initially in the dotted line position of FIG. 1, one or more, and ordinarily several, successive fiber diameter measurements are taken, at 12, and are successively substituted, as at 19, for what is nominally the last previous valid measurement, at 14. Thus, in effect, each successive diameter measurement is initially characterized as a valid measurement, so long as the switch 11 is in its dotted line position.

As each successive diameter measurement is taken, such measurement is indicated by a suitable display device. For example, a digital display mechanism may be associated with flow chart box 14 in order to provide a continuous indication of successive diameter measurements taken at 12. Since a typical count value, as mentioned previously, may be somewhat in excess of 400 counts, i.e., for a 100 micrometer fiber diameter, and since dropouts, which involve variations by more than two counts, can be expected to occur relatively infrequently, a first effective digit of "4" will ordinarily be indicated more or less continuously by the display device in the hundreds column while the switch 11 remains in its dotted line position.

The switch 11 may now be thrown to its solid line position. It will be assumed, for the moment, that the diameter measurement taken just prior to such throwing of the switch 11 was, indeed, a valid one, i.e., that it did not represent a dropout. This probably valid assumption is characteristic, for example, of points within zone B in FIG. 3. Thus, the first effective digit indicated by the display device will now most likely be a "4" in the hundreds column. The system of FIG. 1 will now continue to operate in the manner previously discussed with reference to the switch 11 being in its solid line position, such that each new fiber diameter measurement determined to be valid will be indicated by the display device associated with box 14. Thus, as each new valid count is indicated, some variation in the final digit or final two digits may be expected on the display device, as the system continues to function while monitoring the diameter of successive axial portions of the optical fiber undergoing examination.

If, on the other hand, an invalid diameter measurement, e.g., one representing the dropout 8 (FIG. 3), was taken just prior to the throwing of the switch 11 (FIG. 1) from its dotted line position to its solid line position, the first effective digit indicated by the display device will most likely be other than a "4" in the hundreds column. Moreover, the dropout causing such anomalous, invalid measurement will most likely have been an isolated one, as is true of the dropout 8. As a result, succeeding, actually valid counts will most likely differ by more than the maximum allowed value from the standard, i.e., a count, which the system believes to be valid, but which, in fact, represents a dropout, as represented by zone A' in FIG. 3. Accordingly, the operation illustrated by box 16 will continue to cause the "YES" path in FIG. 1 to be followed, the last previous valid measurement in box 14 will not be updated, at box 17, and the indication by the display device will continue unchanged, even in its final digit, for an extended period of time. Thus, the use of an incorrect validity standard at box 14 will become quite apparent. By now returning the switch 11 to its dotted line position, then bringing it back to its solid line position and again checking for apparent validity of the indication by the display device, a correct validity standard may be provided at box 14, whereupon the system may be permitted to continue to operate correctly with the switch 11 remaining in its solid line position.

Should the initial throwing of the switch 11 to its solid line position have occurred in a zone, e.g., zone C in FIG. 3, which includes a succession of dropouts, the use of an incorrect validity standard at box 14 (FIG. 1) will become apparent, for similar reasons, e.g., upon an end to the succession of dropouts. Corrective action, by rethrowing the switch 11, may then be taken.

Figure 2:
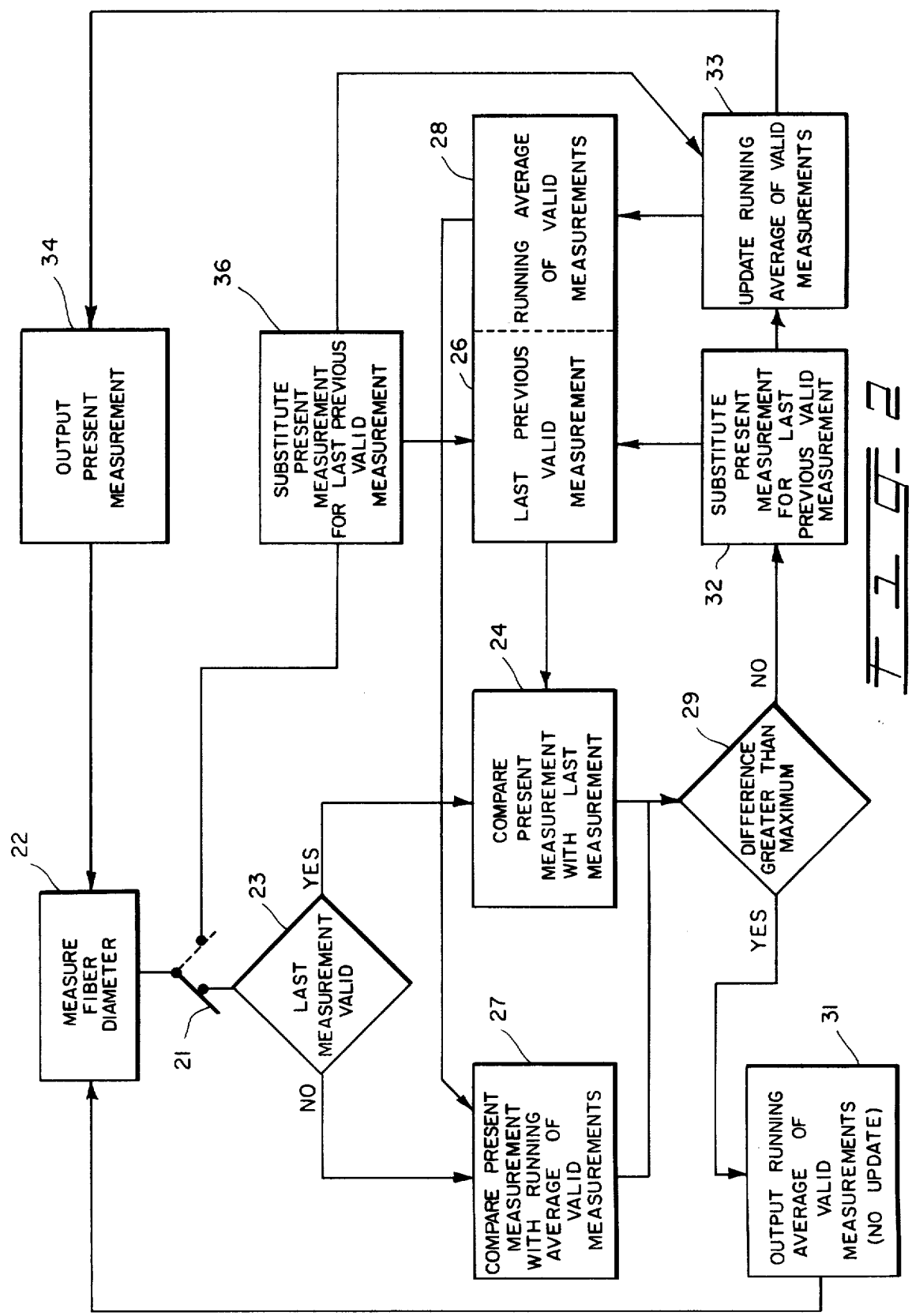
FIG. 2 is a flow chart illustrating a second embodiment of a system for monitoring successive axial portions of an optical fiber, wherein the effect of occasional dropouts on the taking of diameter measurements is eliminated.

Turning now to FIG. 2 of the drawing, a second embodiment of a system for measuring the diameters of successive axial portions of an optical fiber is illustrated in flow chart format. This embodiment is also particularly well suited for use in performing the optical fiber testing technique of the Watkins copending application.

The system shown in FIG. 2 will initially be described with a switch 21, which corresponds to the switch 11 of the FIG. 1 embodiment previously described, in a normal operating position indicated by a solid line in FIG. 2. Thus, each diameter measurement taken by an optical fiber diameter measuring system, e.g., the system disclosed in the Watkins application, as indicated by box 22 in FIG. 2, is compared with a standard which is dependent, as indicated by box 23, on whether the immediately preceding diameter measurement was, or was not, indicated as valid. If the immediately preceding diameter measurement was indicated as valid, the "YES" path of FIG. 2, leading from box 23 to box 24, is followed. Thus, the present measurement is compared, as at 24, with the immediately preceding diameter measurement, a standard which is, in fact, the last previous valid measurement, as at 26, corresponding to the standard of the FIG. 1 embodiment. If, on the other hand, the immediately preceding diameter measurement was not indicated as valid, the "NO" path of FIG. 2, leading from box 23 to box 27, is followed. Thus, the present measurement is compared, as at 27, with a standard constituting a running average, as at 28, of those previous diameter measurements which have been indicated as valid. Such running average, which takes the form of a relatively smooth curve, is represented by the dotted line 7' in FIG. 3.

Whether the instantaneous standard be the last previous valid measurement, at 26 (FIG. 2), corresponding to a valid, immediately preceding diameter measurement, or a running average of previous valid measurements, at 28, not including an invalid, immediately preceding diameter measurement, the comparison, at 24 or 27, provides a measure or indication of the difference between the present diameter measurement and such standard. This difference is examined, as at 29, in order to determine whether the difference is greater than a predetermined, maximum allowed value of such difference for validity of the present diameter measurement, e.g., the previously suggested two count, maximum allowed value. The pairs of parallel lines at zones A, B, C, D and E in FIG. 3 may be taken as representative of upper and lower limits for diameter measurement validity at certain points along the lines 7 and 7' within such zones.

If the difference between the present diameter measurement and the appropriate standard is greater than the maximum allowed value, such that a dropout is presumably present, as shown at zones A and C in FIG. 3, the "YES" path of FIG. 2, leading from box 29 to box 31, is followed. Thus, the running average of previous valid diameter measurements is outputted, as at 31, instead of the present diameter measurement, and the next fiber diameter measurement is taken, at 22. Alternatively, the present diameter measurement may simply be omitted from the set of data collected in order to characterize the fiber. In either case, the particular axial portion of the fiber being examined where the dropout is located may be indicated, e.g., by a suitable signal or marker, for identification as a probable fault location.

If, on the other hand, the difference in diameter measurements is found not to be greater than the maximum allowed value, as shown at zones B, D and E in FIG. 3, the "NO" path of FIG. 2, leading from box 29 to box 32, is followed. Thus, the present diameter measurement is substituted, as at 32, for the last previous valid measurement, at 26, in order for the present diameter measurement to serve as a new validity standard against which the next successive diameter measurement to be taken at 22 may be compared. The running average of valid diameter measurements, at 28, is also updated, as at 33, to include the present diameter measurement. The present diameter measurement is then outputted, as at 34, i.e., indicated as valid and utilized to characterize the optical fiber undergoing examination, whereupon the next successive diameter measurement is taken, at 22, as the cycle repeats. Thus, the path 7 and/or 7' in FIG. 3 may be followed during the collection of data as to diameters along successive axial portions of the fiber, with the dropouts 8 and 9 again not resulting in any anomalous diameter reading.

The manner in which an initial, valid diameter reading, and an initial running average of valid diameter measurements, may be determined, permitting subsequent use of the system of FIG. 2 in the continuous monitoring of the diameter of successive axial portions of an optical fiber, will next be described. With the switch 21 initially in the dotted line position of FIG. 2, one or more, and ordinarily several, successive fiber diameter measurements are taken, at 22, and are successively substituted, as at 36, for what is nominally the last previous valid measurement, at 26. Thus, in effect, each successive diameter measurement is initially characterized as a valid measurement, so long as the switch 21 is in its dotted line position. In addition, the running average of valid measurements, at 28, is continually updated, at 33, again initially characterizing each successive diameter measurement taken at 22 as valid, so long as the switch 21 is in its dotted line position.

As each successive diameter measurement is taken, such measurement is indicated by a suitable display device. For example, a digital display mechanism may be associated with flow chart box 26 in order to provide a continuous indication of successive diameter measurements taken at 22. Once again, in view of the fact that a typical count value may be somewhat in excess of 400 counts, and of the fact that dropouts of, say, more than two counts occur relatively infrequently, a first effective digit of "4" will ordinarily be indicated more or less continuously by the display device in the hundreds column while the switch 21 remains in its dotted line position.

The switch 21 may now be thrown to its solid line position. Since the diameter measurement taken just prior to such throwing of the switch 21 has been characterized as valid, the "YES" path from box 23 to box 24 will be followed. It will be assumed, for the moment, that such preceding diameter measurement was, indeed, a valid one, i.e., that it did not represent a dropout. This probably valid assumption is characteristic, for example, of points within zone B in FIG. 3. Thus, the first effective digit indicated by the display device will now most likely be a "4" in the hundreds column. The system of FIG. 2 will now continue to operate in the manner previously discussed with reference to the switch 21 being in its solid line position, such that each new fiber diameter measurement determined to be valid will be indicated by the display device associated with box 26. Thus, as each new valid count is indicated, some variation in the final digit or final two digits may be expected on the display device, as the system continues to function while monitoring the diameter of successive axial portions of the optical fiber undergoing examination. In addition, each successive count value indicated by the display device will, with very few exceptions corresponding to occasional dropouts, be substantially equal to the count value for the running average of valid measurements, which may be indicated by another display device associated with flow chart box 28.

If, on the other hand, an invalid diameter measurement, e.g., one representing the dropout 8 (FIG. 3), was taken just prior to the throwing of the switch 21 (FIG. 2) from its dotted line position to its solid line position, the first effective digit indicated by the display device associated with box 26 will most likely be other than a "4" in the hundreds column. Moreover, the dropout causing such anomalous, invalid measurement will most likely have been an isolated one, as is true of the dropout 8. As a result, the next successive, actually valid count will most likely differ by more than the maximum allowed value from the current standard, i.e., the preceding diameter measurement which, in fact, represents a dropout as represented by zone A' in FIG. 3. Thus, the "YES" path will be followed from box 29 to box 31. Accordingly, the running average of measurements previously characterized as valid, i.e., of the measurements previously taken with the switch 21 in its dotted line position, will be outputted as representing the diameter of the new axial portion of the optical fiber being examined.

Another diameter measurement will now be taken, at 22, with the measurement just taken now not considered to be valid, such that the "NO" path from box 23 to box 27 will now be followed. Accordingly, the running average of valid measurements, at 28, will now be the standard for validity. Assuming, as is most likely the case, that this newest diameter measurement does not represent another dropout, the path 27, 29, 32, 33, 34, 22 will be followed through the flow chart of FIG. 2, such that the newest diameter measurement replaces the dropout as the now truly valid standard at box 26, and correct monitoring continues thereafter. If, however, this newest diameter measurement should happen to represent another dropout, as would be the case, for example, with respect to the successive dropouts at 9 in zone C in FIG. 3, the running average of previous measurements will ordinarily to be outputted until such time as a present measurement differs from such running average by no more than the maximum allowable value, i.e., upon the termination of a short succession of dropouts at 9.

Thus, the system of FIG. 2 will continue to operate in the manner previously discussed with reference to the switch being in its solid line position, normally without any necessity of rethrowing the switch 21 as would be required for the switch 11 in the FIG. 1 system, should the respective switch 21 or 11 have been thrown just after a dropout 8 or 9 (FIG. 3) had occurred. The display devices associated with the respective boxes 26 and 28 (FIG. 2) will be indicating substantially equal count values, each with a first effective digit of "4" in the hundreds column and with minor variations in the final digit or two digits displayed. Of course, should any anomaly in the indications by the display devices become apparent, a correction may still be made by the technique of rethrowing the switch 21.

Figure 4:
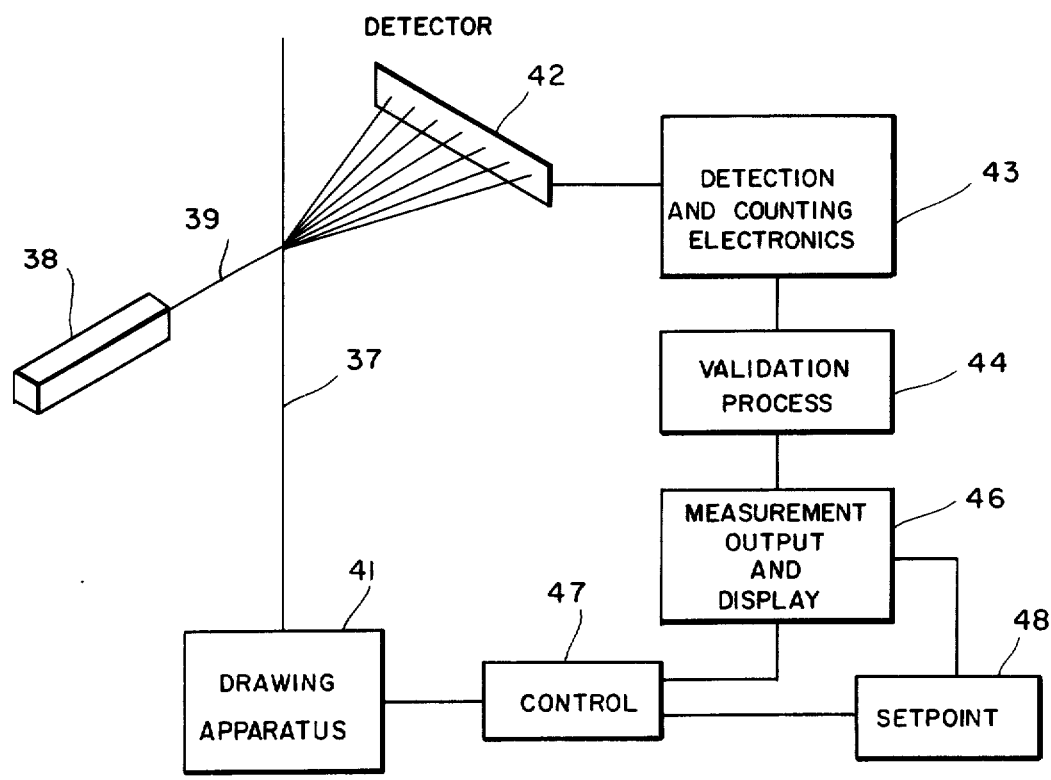
FIG. 4 is a schematic illustration, partly in the form of a flow chart, showing certain equipment which may be used in performing the monitoring techniques outlined in FIGS. 1 and 2, and further demonstrating the use of the FIG. 1 or FIG. 2 system in controlling the diameter of an optical fiber during the drawing of the fiber.

Referring next to FIG. 4 of the drawing, a system for monitoring and controlling the diameter of an optical fiber 37, during the drawing of the fiber 37, is illustrated. Such system, which may employ a monitoring technique of the type of FIG. 1 or 2, includes a source 38 of a beam 39 of coherent, monochromatic radiation. The source 38 directs the beam 39 radially onto the fiber 37 as the fiber 37 advances axially, i.e., along the vertical direction in FIG. 4, during the operation of an appropriate fiber drawing apparatus 41. A detector mechanism 42, for example, a scanned diode array, is suitably positioned to sense the presence of interference fringes in a predetermined range of forward scattering angles across the fiber 37 from the source 38.

Associated with the detector mechanism 42 are detection and counting electronics, as at 43, such as are utilized, e.g., in connection with the copending Watkins application, in order to generate a succession of counts, representative of the diameters of successive axial portions of the advancing fiber 37. The successive counts are each subjected to a validation process, as at 44, of the type previously described in connection with FIGS. 1 and 2 of the drawing. A measurement output and display operation, as at 46, as also previously described in connection with FIGS. 1 and 2, thereupon provides a succession of valid, diameter indications. These valid, diameter indications are compared by a control system, as at 47, with a set point, as at 48. The set point, at 48, constitutes a count level corresponding to a desired diameter value for the axially advancing fiber 37.

The control system, at 47, serves to control the fiber drawing operation by regulating, e.g., the speed of the drawing apparatus 41, in such manner as to tend to reduce the variation from the set point count level of each successive valid, diameter indication. Thus, the diameters of successive axial portions of the advancing fiber 37 may be controlled toward the desired diameter value irrespective of any count or count corresponding to one or more dropouts, such counts simply not being indicated as valid by the validation process, at 44, and, therefore, not being transmitted to the control system, at 47.

It is to be understood that the described methods are simply illustrative of preferred embodiments of the invention. Many modifications may, of course, be made in accordance with the principles of the invention.

What is claimed is:

1. A method of monitoring the diameters of successive axial portions of an optical fiber, the method comprising the steps of:
   a. illuminating the fiber with a radially directed beam of coherent, monochromatic radiation so as to create a forward scattering pattern;
   b. advancing the fiber relative to the beam along the direction of the axis of the fiber;
   c. generating a succession of counts of numbers of interference fringes within a predetermined portion of said pattern, each succeeding count being indicative of the diameter of a different axial portion of the fiber advanced relatively across said beam;
   d. comparing the difference between each successive count and an immediately preceding count, where said immediately preceding count has been indicated as valid, with a predetermined, maximum allowable value of said difference for validity of said successive count;
   e. for each successive difference, among the counts compared with valid, immediately preceding counts in accordance with step (d), which is no greater than said maximum allowable value, indicating as valid the successive count associated with said difference;
   f. for each successive count not following an immediately preceding count which has been indicated as valid, comparing the difference between said successive count and a running average of those previous counts which have been indicated as valid, with said predetermined maximum allowable difference value; and
   g. for each successive difference, among the counts compared with said running average of previously valid counts in accordance with step (f), which is no greater than said maximum allowable value, indicating as valid the count associated with said difference.

2. A method as set forth in claim 1, further comprising:
   h. identifying as a probable fault location each axial portion of the fiber where the corresponding count is not indicated as valid.

3. A method as set forth in claim 1, further comprising controlling the diameter of the optical fiber during drawing by:
   h. performing steps (a) through (g) during drawing of the fiber; and
   i. controlling the fiber drawing process in such manner as to tend to reduce the variation, from a predetermined, desired count level, of each successive count indicated as valid, irrespective of any count or counts not indicated as valid.

4. A method of monitoring the diameters of successive axial portions of an optical fiber, the method comprising the steps of:
   a. illuminating the fiber with a radially directed beam of coherent, monochromatic radiation so as to create a forward scattering pattern;
   b. advancing the fiber relative to the beam along the direction of the axis of the fiber;
   c. generating a succession of counts of numbers of interference fringes within a predetermined portion of said pattern, each succeeding count being indicative of the diameter of a different axial portion of the fiber advanced relatively across said beam;
   d. comparing the difference between each successive count and a last previous count which has been indicated as valid, with a predetermined, maximum allowable value of said difference for validity of said successive count; and
   e. for each successive difference which is not greater than said maximum allowable value, indicating as valid the successive count associated with said difference.

5. A method as set forth in claim 4, further comprising:
   f. identifying as a probable fault location each axial portion of the fiber where the corresponding count is not indicated as valid.

6. A method as set forth in claim 4, further comprising controlling the diameter of the optical fiber during drawing by:
   f. performing steps (a) through (3) during drawing of the fiber; and
   (g) controlling the fiber drawing process in such manner as to tend to reduce the variation, from a predetermined, desired count level, of each successive count indicated as valid, irrespective of any count or counts not indicated as valid.

* * * * *